July 26, 1955  R. H. WISE  2,714,005
MOTION TRANSMITTING DEVICE
Filed Sept. 28, 1953  3 Sheets-Sheet 1
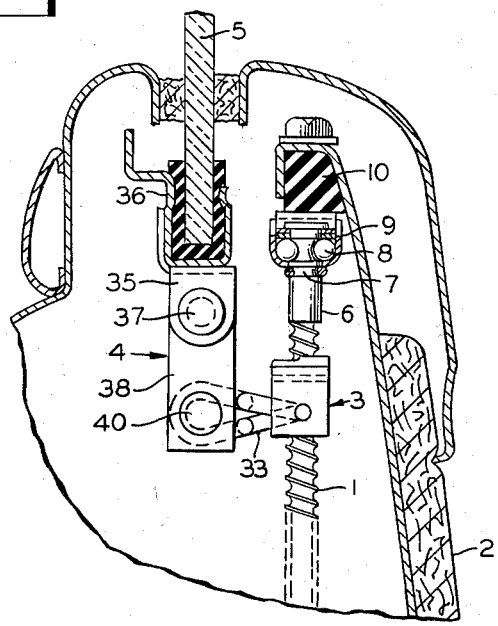
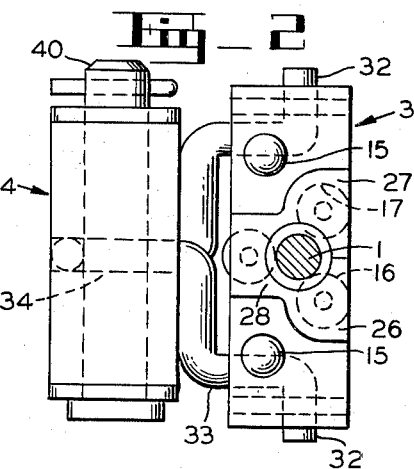
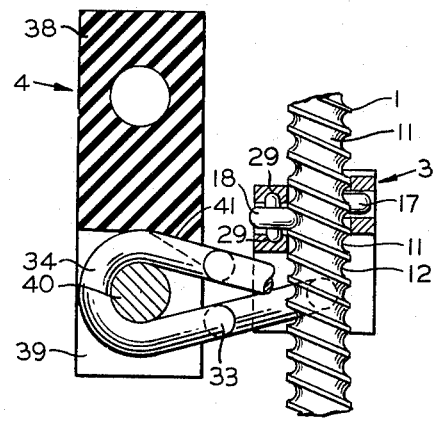
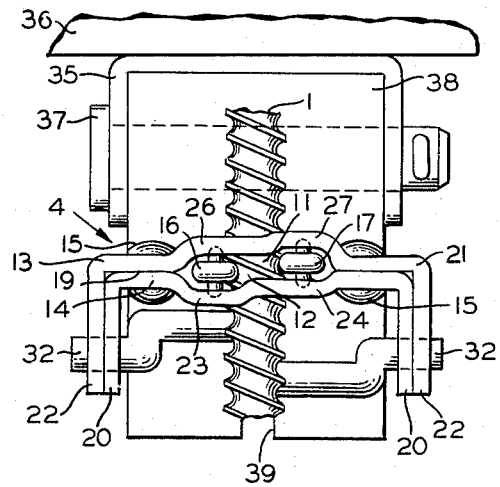
*INVENTOR.*
RALPH H. WISE
BY Charles S. Penfield
ATTORNEY

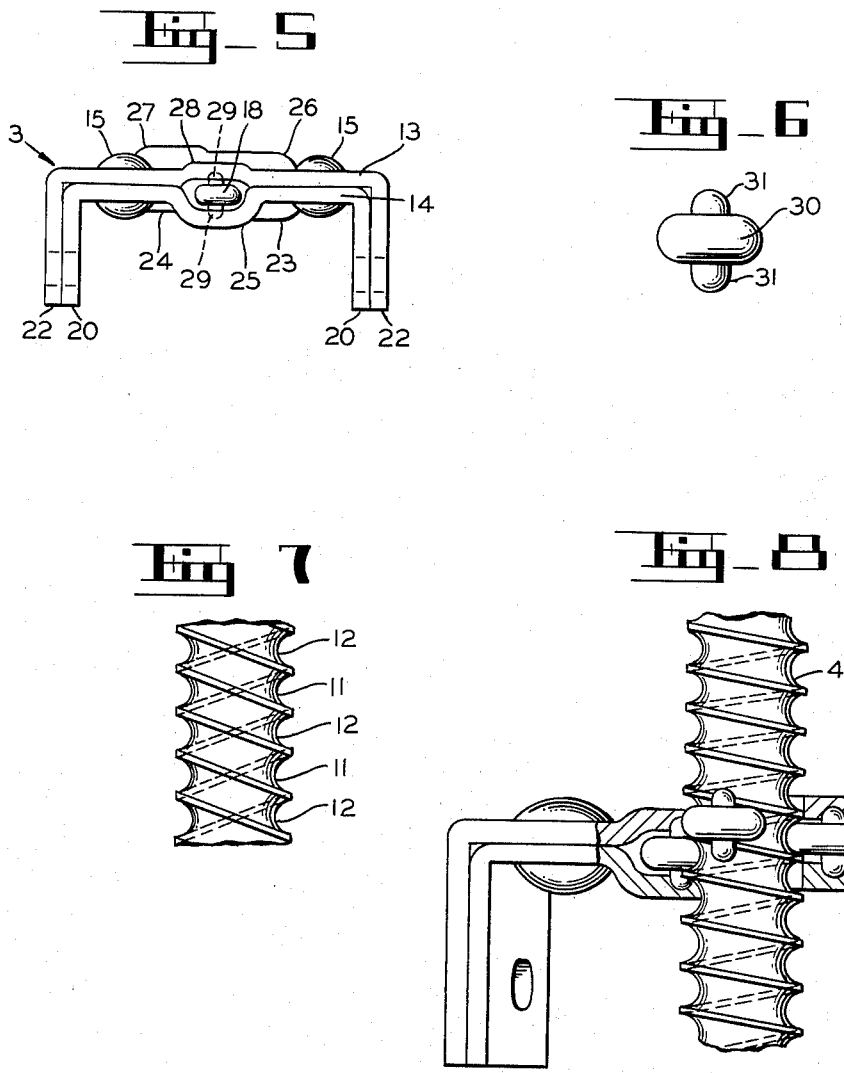

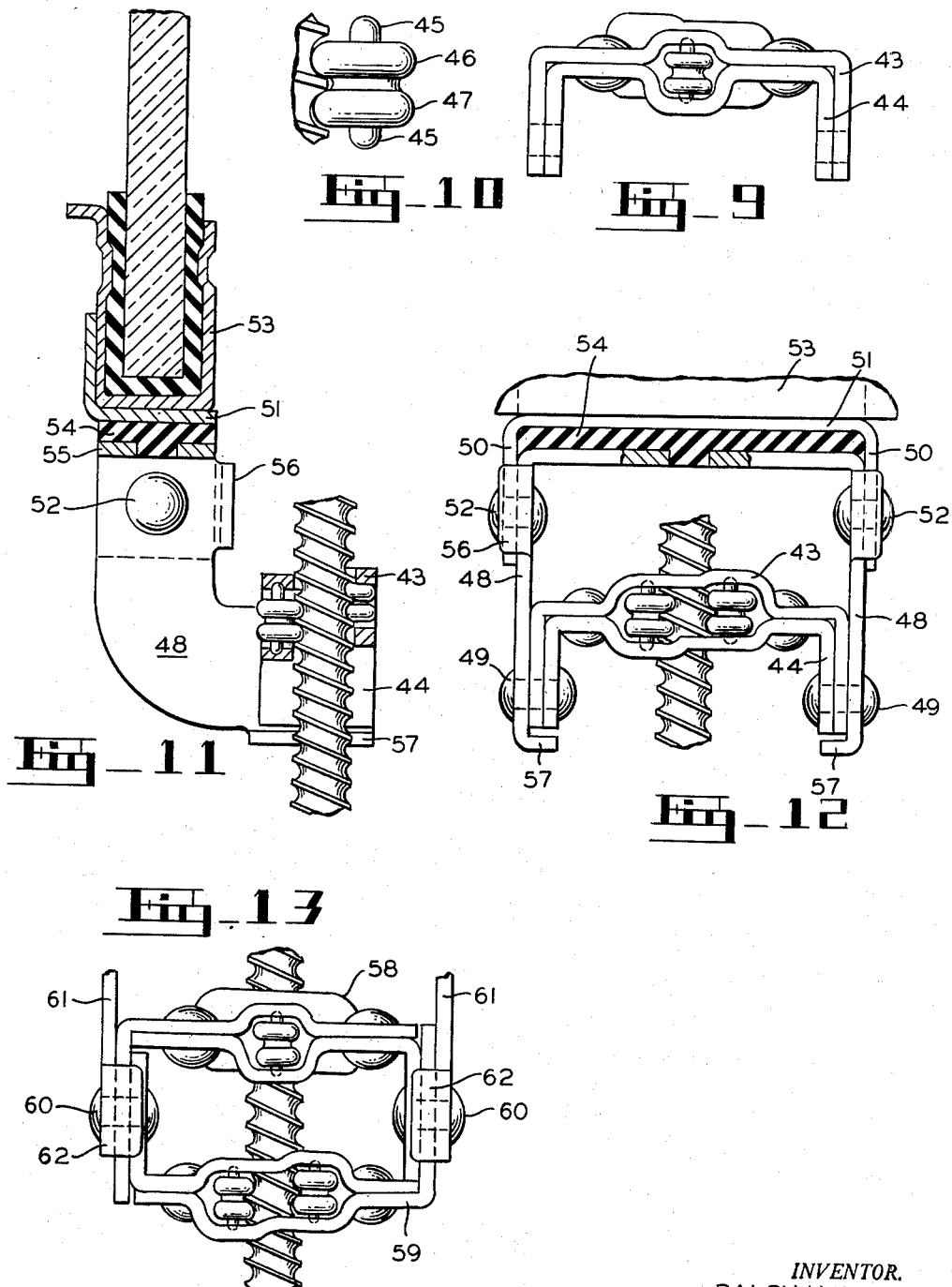

United States Patent Office 2,714,005
Patented July 26, 1955

2,714,005

MOTION TRANSMITTING DEVICE

Ralph H. Wise, Gary, Ind., assignor to Productive Inventions, Inc., a corporation of Indiana Application September 28, 1953, Serial No. 385,002

21 Claims. (Cl. 268—133)

This invention relates generally to means for transmitting motion and more particularly is directed to an improved roller or nut assembly and its operative relationship with a screw or threaded shaft.

This application is a continuation-in-part of my copending application Serial No. 365,833, filed July 3, 1953.

The invention may be used wherever applicable but has proven particularly successful in raising and lowering a window in the door of an automotive vehicle.

An important object of the invention is to provide a torque conversion assembly embodying improved principles of design and construction, for reducing friction and effecting a stabilized connection between the assembly and a screw.

More specifically in this regard, an object of the invention is to provide a nut assembly comprised of a pair of retainer members and three roller bearings pivotally mounted between the members for cooperation with one or more threads of a screw. The invention contemplates the utilization of different forms or modifications of roller bearings for various installations and load requirements.

A particular object of the invention is to provide a novel nut assembly in which the roller bearings are preferably equally spaced apart circumferentially and longitudinally with their axes in parallel relation. The assembly may be used with a shaft provided with one or more threads but is preferably used with a shaft having a double thread so that two of the bearings will cooperate with one thread and the other bearing will cooperate with the other thread in a manner whereby to afford a stabilized connection between the assembly and shaft. This arrangement has proven very satisfactory in use and provides a thrust of considerable force or power with increased speed of operation as compared to a setup in which the nut assembly is associated with a single threaded screw.

Another object of the invention is to provide a roller which is preferably formed with toroidal bearing surfaces which straddle a portion of the thread of a shaft for engagement with such portion at points between its base and crest. Otherwise expressed, the multiple points of contact between each roller and a threaded portion are preferably located between the crests of the threads and the root diameter of the threads.

Another object of the invention is to provide various modifications of unique operative connections between a nut assembly and the means adapted to be actuated thereby when the screw is rotated.

An important feature of each of such connections is to provide means assisting to automatically hold a means to be actuated, such as a window, in any position to which it has been moved after the means for actuating the shaft is rendered inoperative.

A specific object of the invention is to provide an assembly comprised of few parts which can be economically manufactured and assembled on a production basis.

A further object of the invention is to provide an assembly which is durable, readily operable and efficient and positive in action.

Additional objects and attributes of the invention will become evident when the description hereinafter set forth is considered in conjunction with the drawing annexed hereto.

In the drawings:

Figure 1 is a partial vertical section showing the application of the invention to a window in a vehicle door;

Figure 2 is a top view of the nut assembly showing its connection with a screw and a novel connection whereby the nut assembly may be operatively connected to the window;

Figure 3 is a partial vertical section of the structure illustrated in Figure 2 showing certain details of construction;

Figure 4 is an elevational view of a part of the structure illustrated in Figure 1;

Figure 5 is an elevational view of the nut assembly showing the roller bearings housed in a cage comprised of retainer members;

Figure 6 is a view of one of the three roller bearings carried by the retainer members;

Figure 7 is an enlarged elevational view of a portion of the screw exemplifying the double thread arrangement;

Figure 8 is an elevational view illustrating the use of the nut assembly with a single threaded screw;

Figure 9 is a modified form of a nut or roller assembly provided with rollers having multiple contact or bearing surfaces for engaging a screw;

Figure 10 is a side view of a roller of the type used in the assembly of Figure 9, showing the preferred manner in which the rollers engage a screw;

Figure 11 is a vertical sectional view taken at an appropriate location through Figure 12 of a modified form of operative connection between the nut assembly and a window;

Figure 12 is a front view of the structure shown in Figure 11; and

Figure 13 is a front view of a modified assembly embodying a pair of the nut assembly units depicted in Figure 9.

The invention as mentioned above may be utilized wherever applicable but as illustrated in the drawings is operatively associated with the window of an automotive vehicle. A pair of corresponding motion transmitting means are used to raise and lower the window but only one of such means is exemplified since both are substantially identical.

Referring particularly to Figure 1 of the drawing, there is shown, among other things, a screw or threaded shaft 1 vertically supported for rotation in a vehicle door 2, a nut assembly generally designated 3 carried by the screw, and novel connection means generally designated 4 operatively connecting the nut assembly with a window 5. A power unit, such as an electric motor, not shown, is utilized to rotate the screw clockwise or counter-clockwise to cause the nut assembly to travel longitudinally in either direction on the shaft.

The screw or shaft 1 may be supported in any one of various ways, but as illustrated its upper end is preferably provided with a cylindrical sleeve 6 having a groove 7 therein which cooperates with ball bearings 8 seated in a race 9. The race is resiliently supported on a block of rubber 10 preferably carried by the upper extremity of the inner panel of the door as depicted in Figure 1. The lower end of the screw is preferably supported in a suitable guide or bearing, not shown, so as to stabilize the thrust of the screw.

The screw shown in Figures 1 through 4 and 7 of the drawing is of the multiple thread type. More particularly, it includes double left hand threads 11 and 12, preferably formed by a well known rolling method. Obviously, the threads may be right handed in which event the rollers and retainers will be symmetrically opposed.

The nut assembly generally designated 3 may be constructed in various ways and as shown most clearly in Figures 2 through 5, preferably includes a pair of retainer members 13 and 14 which are secured together by any suitable means, such as by rivets 15 to provide a support, housing or cage for three roller bearings 16, 17 and 18. The retainer member 14 will be referred to as the inner member and member 13 as the outer member because they are assembled in a nesting relationship. The inner member includes a base 19 and side walls 20 and the outer member similarly includes a base 21 and side walls 22. When the members are secured together as shown in Figure 4 their bases are engaged and the same is true of their side walls. The bases of the retainer members are provided with suitable clearance openings for the shaft as shown in Figures 2 and 3. With this setup the members are positively held against displacement to provide what can be termed a supporting means, carriage or housing. As depicted in Figures 2, 4 and 5, the base 19 of the inner member is provided with three offset formations 23, 24 and 25 and the base 21 of the outer member is similarly provided with three formations 26, 27 and 28. As clearly illustrated in Figures 4 and 5, the base portions of the formations on the inner member are arranged in opposed predetermined spaced parallel relationship with the base portions of the formations on the outer member to provide pockets for the roller bearings. The base portion of each of the formations is provided with a concave seat 29.

Each of the roller bearings, as clearly depicted in Figure 6, includes a round disc or unit portion 30 and a pair of aligned axle portions 31. The periphery of the disc portion is rounded or convex in form for proper rolling engagement with a thread and the ends of the axles are rounded for engagement with the concave seats 29 in a manner to afford free rotation of the bearings about fixed axes. It will be noted that when the bearings are secured in the retainer members that they are preferably equally spaced longitudinally and circumferentially. More specifically, attention is directed to the fact that the disc-like bearing portions 30 are preferably arranged in a stepped or generally axially spaced relationship so that they will rotate in equally spaced apart planes disposed transverse to the longitudinal axes of the support or carriage supporting the bearings. The bearing portions 30 are preferably formed to engage the shaft at longitudinally spaced points.

The relationship of the various components or members is preferably such that the bearings 17 and 18 will cooperate with the left hand thread 11 and the bearing 16 will cooperate with the left hand thread 12 as shown in Figures 3 and 4 to provide a well balanced and stabilized setup which maintains the torque conversion assembly in a substantially transverse position with respect to the longitudinal axis of the screw.

The side walls of the retainer members are provided with aligned apertures as shown in Figure 4. The ends 32 of a bent fitting 33 are journalled in the apertures. The fitting is provided with a loop or bight portion 34 located midway between the ends and in the plane of the screw.

The connection means generally designated 4 will now be described. This means preferably includes a yoke 35 secured to a bottom channel 36 carried by the window 5 as shown in Figure 1. A pin 37 extends through the ends of the yoke and through the upper extremity of a rectangular rubber block 38 for pivotally supporting the block. The lower extremity of the block is provided with a vertical slot 39 within which the loop portion 34 of the fitting 33 projects and a pin 40 extends through the block and the loop for pivotally supporting the fitting as depicted in Figure 3. The block is preferably provided with an inclined portion 41 at the base of the slot, which before compression takes the position indicated by the dotted lines in Figure 3. When the various components are located as in Figure 1, the inclined portion 41 is compressed to the full line position as shown in Figure 3. The inclined portion serves to maintain the fitting in a desirable operative relationship with the nut assembly and block.

In Figure 8 of the drawing there is exemplified a screw or threaded shaft provided with a single thread 42 and a nut assembly provided with three roller bearings cooperating with this thread. This arrangement has proven satisfactory but does not offer certain advantages with respect to stability that is presented by a double threaded screw or shaft as described above.

In view of the foregoing, it will be apparent that, rotation of the shaft 1 in a counter-clockwise direction as viewed in Figure 2, will cause the roller bearings 17 and 18 cooperating with one thread and bearing 16 cooperating with the other thread to elevate the nut assembly and simultaneously carry with it the window 5. The rubber blocks 10 and 38 serve to dampen noise and compensate for factors respecting misalignment of certain of the parts. The inclined portion 41, as stated above, is normally compressed and maintains the block 38 in substantially parallel relationship with the shaft 1 so as to alleviate binding between the rollers and shaft when the latter is rotated. The block 38 automatically adjusts itself to the window and nut assembly when the shaft is operated. Rotation of the shaft in a clockwise direction, as viewed in Figure 2, will cause the nut assembly to travel downwardly on the shaft and lower the window.

The roller of the type above described is entirely adequate for many types of installations or load requirements but where the loads are heavier or longer service life is desirable, multiple contact rollers of the character exemplified in Figures 10 through 13 of the drawings may be employed, with suitable alternations in the retainer or supporting members to accommodate the dimensional characteristics of the rollers.

Referring particularly to Figure 9 of the drawing there is illustrated a nut or roller assembly comprising a pair of retainer members 43 and 44 and three rollers. This assembly substantially corresponds to the assembly illustrated in Figure 5 except that the rollers are of a different form. Each roller preferably includes a pair of corresponding axle or pivot portions 45 and a pair of corresponding bead formations or units 46 and 47. As mentioned above the design or shape of the formations may be varied to suit different requirements, but as herein illustrated each formation is preferably constructed to provide an annular convex bearing portion having opposed corresponding toroidal contact or bearing surfaces as exemplified in Figure 10. More particularly in this regard, the rotatable elements each have one or more thread-contacting units, such as 46 and 47, which have, normal to their axes, cross-sectional areas circular in form and diminishing progressively in either direction from the cross-section medial thereto, said units having parallel vertical cross-sectional areas elliptical in form and diminishing progressively in area in either direction from the cross-sectional area taken through the axis of said unit; whereby to provide, inward from the crest of the threads, substantially a point contact between the rotatable elements and portions of said threads.

The assembly illustrated in Figure 9 may be operatively connected with a window or other device to be actuated in any manner desired, but as illustrated in Figures 11 and 12 the assembly is preferably supported on and between the lower extremities of a pair of corresponding side portions 48 of a hanger by a pair of rivets 49. The upper extremities of the portions 48 are preferably connected to the depending arms 50 of a bracket 51 by rivets 52. The bracket 51 is preferably permanently secured to the lower part of a window frame 53 as shown in Figures 11 and 12. A resilient means 54, preferably in the form of a rectangular piece of rubber is interposed between the bracket and the bridge portion 55 of the hanger. The resilient means 54 is preferably held between the bracket and the hanger by providing the hanger with an opening and the resilient means with a projection disposed in the opening. The side portions 48 of the hanger are provided with corresponding offset portions 56 which are located adjacent to the depending arms 50 of the bracket so as to control, within practical limits, the pivotal movement between the hanger and the bracket. The lower extremities of the side portions 48 are further provided with inturned end portions 57 which serve to control pivotal movement of the roller assembly with respect to the hanger. These controlled movements serve to stabilize the operative connection between the screw and the window or a device to be actuated and the resilient means 54 functions to reduce noise and otherwise cushion the movement between the hanger and the bracket. The connection illustrated in Figures 11 and 12 has, for some installations, proven more stable than the connection illustrated in Figure 4 of the drawing. The connection illustrated in Figures 11 and 12 also affords an improved arrangement for automatically holding the window in any position to which it has been moved after the means for rotating the screw is rendered inoperative. More particularly in this regard, the construction of the connection and its operative relationship with the window and screw is such that the rollers will cramp on the screw and automatically hold the window in any vertical position to which it has been moved after the means for actuating the shaft is rendered inoperative.

Rollers of the multiple-contact type offer a number of important advantages over the single contact form of roller as shown in Figure 6. One advantage of the multiple contact form is that the length of the axis provides a much greater resistance to the tendency of the roller to tilt under load while in engagement with the drive screw or shaft. Side pressures, thrust and wear on the axle portions or pivots is also greatly reduced. Further, each individual roller segment or bead portion of the multiple roller bearing may contact the screw, thus minimizing the abrasive tendencies under contact pressure of the load being transmitted. Moreover, with a roller having a single bearing surface the thread of the screw may tend to "iron out" into a sharper edge with the result that the outside diameter of the screw is increased and the life of the thread may be shortened. A roller having a plurality of axially spaced bearing surfaces provides therebetween a groove which may be formed suitably to prevent ironing out of the edge of the thread thin and may instead be given a contour which tends to hold the thread in a thicker and stronger formation.

Rollers of multiple contact form add stability to the roller assembly; increase the resistance of the assembly and functional parts thereof to deformation under higher loads; reduce frictional resistance of the assembly; give longer life to the drive screw and all other functional parts of the assembly; retard the development of noise in operation by retaining more surfaces of contact between the roller and drive screw; minimize cramping or bending of the screw through misalignment of the screw with the nut or roller assembly; and also tend to minimize whipping of the screw at high speeds.

It will be obvious that, due to the novel construction and arrangement of the functional parts of the assembly, the advantages of a roller having multiple contact or bearing surfaces as set forth above may be obtained with a small increase in cost. For example, the cost of producing a multiple-contact roller as against a single contact roller is almost entirely limited to the cost of the additional material required, since these rollers normally would be produced on an automatic machine which would require for a multiple-contact roller very little, if any, more time in operation than it would for a single roller.

It is to be understood that the rollers may be made in one unit or by an assembly of parts. The axle or pivot, for example, may be a separate part extending through a single hole or bore in the roller itself. Such axle or pivot may run free at each end or may be held rigidly at each end, if desired, causing a roller or rollers to rotate on the pivot.

In some installations to meet load requirements, it may be desirable to connect a pair of the nut or roller assemblies together as illustrated in Figure 13 of the drawing. More particularly in this respect, Figure 13 discloses a pair of corresponding subassemblies 58 and 59 which are preferably connected together in axial spaced apart relationship by a pair of rivets 60. In order to improve the balance and stability of the structure the assemblies 58 and 59 are preferably constructed and arranged so that the rollers in one assembly are respectively located substantially midway between the rollers of the other assembly. In other words, when looking down on the structure the rollers are substantially equally spaced apart 60 degrees. The structure may be operatively connected with a device to be actuated and, as shown, this is preferably accomplished by a hanger having a pair of corresponding depending side portions 61. The side portions 61 may be provided with offset stop portions 62 which are located to control slight movement of the structure with respect to the hanger.

The novel torque conversion assembly constituted by the driving screw and the assembly as shown may be adapted advantageously and economically to many other uses, other than the uses herein disclosed.

A full size operating model of window lift constructed substantially as herein shown and described, has been under terminal impact loads for more than 50,000 complete cycles without alteration and without any failure. Prevailing types of automotive power window lifts are not known to have shown equal desirability and efficiency in any tests or in any service.

The power required to operate the subject window lift is less than normally required for any other known type or design of window lift. A single reversible electric motor of conventional type employed in various cycling tests of full-sized models made according to the subject invention, is still in good and efficient working condition after more than 112,000 cycles in terminal shock tests without alteration of any kind, without failure of any kind, and without loss of power output. Motors of similar size, design and power ratings fail completely in from 40,000 to 60,000 cycles, operating without terminal shock, in other known types of window lifts in general use.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. In a device of the class described, a rotatable driving member having a threaded surface, a driven member engaging said driving member for reciprocal propulsion thereby, said driven member including a housing and a plurality of freely rotatable elements disposed to guidingly embrace said driving member and be driven thereby, said rotatable elements having opposed ends pivoted in the housing, said driven member having a load-bearing portion radially displaced from the axis of said driving member whereby to provide a cramping action between said driving member and said driven member for the prevention of movement therebetween when said driving member is idle and a load is placed on said load-bearing portion.

2. A driven assembly of the kind described comprising a pair of members constructed from sheet material, means securing the members together so that portions thereof will be engaged, each of said members being provided with an aperture which apertures are aligned to provide a passage for the reception of a threaded drive shaft, each of said members also being provided with a plurality of portions offset from those portions which are engaged, the opposed offset portions on the respective members cooperating with one another to provide formations disposed in different planes, each of said offset portions being provided with a seat, and a rotatable thread engaging element arranged in each of the formations and having integral axle portions supported on said seats for rotation.

3. Structure of the character described comprising a carriage having rotatable elements for engaging a threaded drive shaft, a fitting pivotally connected to the carriage and provided with means for connecting the fitting to a component adapted to be actuated by the carriage travelling on the shaft, and means on the carriage and fitting for controlling the pivotal movement between the carriage and fitting.

4. A driven assembly of the kind described comprising a pair of members, means securing the members together, each of said members being provided with an aperture which apertures are aligned to provide a passage for the reception of a threaded drive shaft, each of said members also being provided with a plurality of offset portions, the offset portions on the respective members being opposed and cooperating with one another to provide formations disposed in different planes, each of said offset portions being provided with a seat, and a rotatable thread engaging element arranged in each of the formations and having axle portions rotatably supported on said seats.

5. In combination: a threaded shaft, an assembly comprising a pair of members secured together, each of said members being provided with an aperture which apertures are aligned and receive said threaded shaft, each of said members also being provided with a plurality of offset portions, the offset portions on the respective members being opposed and cooperating with one another to provide formations disposed in different planes, each of said offset portions being provided with a seat, and a rotatable element arranged in each of the formations for engaging the shaft thread and having axle portions rotatably supported on the seats.

6. In combination: a window adapted for movement in a substantially vertical plane, a threaded shaft disposed in parallel relation to the window, a driven assembly comprising a pair of members secured together, each of said members being provided with an aperture through which the shaft extends, each of said members also being provided with a plurality of offset portions, the offset portions on the respective members being opposed and cooperating with one another to provide formations disposed in different planes, each of said offset portions being provided with a seat, a rotatable element arranged in each of the formations for engaging the thread of the shaft and having axle portions rotatably supported on said seats, means providing a rockable connection between the members and said window, the arrangement being such that when the shaft is rotated in one direction the members and the window as a unit will be moved upwardly and when the shaft is idle the weight of the window will influence the operation of the means connecting the window and members in such a way that the members will tilt and thereby cause the rotatable elements to lock on the shaft and prevent downward movement of said unit.

7. In combination: an upright threaded drive shaft, a carriage having rotatable elements engaging the threads of the shaft, a window adapted for movement in a substantially vertical plane parallel to the plane of the drive shaft, rigid means extending outwardly from the carriage and rockably connected to the window, and means for limiting the relative movement between said window and said rigid means.

8. Structure of the character described comprising a first carriage having rotatable elements for engaging a threaded drive shaft, a second carriage spaced from the first carriage and having rotatable elements for engaging the drive shaft, means connecting said carriages for maintaining them in spaced relationship, a fitting rockably connected to said carriages and provided with means for connecting the fitting to a component adapted to be actuated by the carriages travelling on the shaft, and means for controlling the rockable movement between the fitting and carriages.

9. In combination: a threaded shaft, a carriage provided with rotatable members engaging the threads of the shaft to cause movement of the carriage when the shaft is rotated, and a load-bearing element extending outwardly from the carriage, the engagement of the rotatable members and the threads of the shaft being such that when the shaft is idle and a load is placed on the element in a direction generally paralleling the axis of rotation of the shaft, the carriage will tilt and cause the rotatable members to bind on the shaft and thereby prevent movement of the carriage.

10. In a device of the class described, driving and driven members disposed for relative rotational and longitudinal movement, one of said members having a periphery forming a helical thread having an appreciable longitudinal lead, the other of said members comprising a carrier encompassing a portion of said thread, and a plurality of thread-engaging elements retained by said carrier and freely rotatable relative thereto about separate axes respectively substantially parallel to the axis of said one member, said elements being grouped peripherally about said one member and having thread-engaging portions contacting said one member, said elements each having a toroidal thread-engaging peripheral contour substantially mating with, but smaller than, the thread contour of said one member, so that the convex exterior surface of said elements and the thread surfaces are in only point-to-point contact.

11. A device for converting rotary motion to longitudinal motion, or vice versa, comprising driving and driven members, one of said members having an exterior helical thread of appreciable axial lead, and the other of said members including a carrier embracing a portion of said thread, a plurality of thread-engaging elements mounted on said carrier, said elements being mounted substantially symmetrically about said one member and having toroidal exterior surfaces extending radially of said one member into substantially point-to-point engagement with the thread thereof, and means on said carrier supporting said elements for rotation about axes parallel to the longitudinal axis of said one member, the thread-engaging surfaces of said elements lying in different radial planes of said one member in spaced relation along the axis thereof to insure accurate engagement of said elements with the thread.

12. In a device of the class described, driving and driven members disposed for relative rotational and longitudinal movement, one of said members having peripheral portions defining a helical thread of appreciable longitudinal lead, the other of said members comprising a carrier provided with a medial aperture freely receiving said one member therethrough, and a plurality of thread engaging elements retained by said carrier for free rotation relative thereto, said elements being grouped peripherally about said aperture and having thread-engaging peripheral portions overhanging said aperture, a radial section of said elements being circular and an axial section at the thread-engaging portion of each of said elements being smoothly elliptical and having an axial dimension at that portion overhanging said aperture which is less than the corresponding interthread dimension, so that the peripheral portions of said elements are in substantially point-to-point contact with said one member.

13. A device for converting rotary motion to longitudinal motion, comprising driving and driven members, one of said members having an exterior helical thread of appreciable axial lead, and the other of said members including a carrier embracing a portion of said thread, a plurality of thread-engaging elements mounted on said carrier, said elements being mounted substantially symmetrically about said one member and having toroidal exterior surfaces extending radially of said one member into substantially point-to-point engagement with the thread thereof, an axial section of the thread-engaging portion of one of said elements being smoothly elliptical in contour, and means on said carrier supporting said elements for rotation about axes substantially parallel to the longitudinal axis of said one member, said elements lying in different radial planes of said one member in spaced relation along the axis thereof to insure accurate engagement of said elements with the thread.

14. A device for converting rotary motion to longitudinal motion, comprising driving and driven members, one of said members having an exterior thread of appreciable axial lead, and the other of said members including a carrier embracing a portion of said thread, thread-engaging elements mounted on said carrier and having exterior surfaces engaging opposed portions of the thread, and means on said carrier supporting said elements for rotation about axes substantially parallel to the longitudinal axis of said one member, said elements lying in different radial planes of said one member in spaced relation along the axis thereof to insure accurate engagement of said elements with corresponding portions of the thread.

15. In a device of the class described, driving and driven members disposed for relative rotational and linear movement, one of said members having a periphery forming a helical thread and the other of said members comprising a carrier provided with a medial aperture through which said one member freely extends, and a plurality of thread-engaging elements retained by said carrier for free rotation, said elements being grouped peripherally about said aperture and each having a plurality of thread-engaging exterior surface portions overhanging said aperture, the thread-engaging portions of each of said elements being toroidal in exterior contour and being axially spaced from one another by a surface portion of reduced diameter, said reduced portion being of an axial extent sufficient to bridge the crown of said thread in close-fitting, but normally non-contacting relation thereto, the convex exterior contour of said thread-engaging portions of each of said elements engaging the thread on either side of the crown thereof.

16. In a device for converting rotary motion into linear motion, or vice versa, and including relatively rotatable and longitudinally movable members, one of which has a peripheral helical thread of appreciable lead, the other of said members comprising a thread-engaging element and means supporting said element for rotation about an axis generally parallel to the axis of said thread, said element having a plurality of axially spaced, generally toroidal thrust-transmitting surfaces of smoothly convex outer contour, the adjacent thrust-transmitting surfaces being separated by a portion of reduced diameter intermediate said surfaces, said surfaces being engageable with said thread in thrust-bearing relation thereto, and said reduced portion being normally spaced from the crown portions of said thread in close-running relation thereto.

17. In a device for converting rotary motion to longitudinal motion or vice versa by the cooperation of driving and driven members, one of which is threaded and the other of which is in engagement with the thread, the members being relatively axially and rotationally movable, a thread-engaging element forming an operative part of said other member and having a pair of axially spaced toroidal exterior surfaces joined by a surface portion of reduced diameter, and said element having an axial extension at each extremity thereof forming trunnions concentric with said toroidal and reduced surfaces, said extensions terminating in bearing surfaces adapted to support said elements against radial and/or axial forces acting thereon during relative movement of said driving and driven members.

18. A load bearing assembly comprising a pair of support members, means for securing said members together, said members having opposed portions oppositely offset to define a pocket therebetween, seats formed in the portions of said members defining said pocket, rollers positioned in the pocket and having terminal axle portions engaging the seats, and openings provided in the members between the rollers for receiving a shaft having a peripheral portion adapted to engage the rollers.

19. A load bearing assembly comprising a pair of elongated members formed with relatively offset portions providing a pocket therebetween, said offset portions being provided with integral seats, thread-engaging elements disposed in said pocket and having axle portions rotatably engaging the seats, and spaced means connecting the members at locations apart from the pockets, the members having openings communicating with the pocket between the elements for receiving a threaded shaft adapted to be engaged by said element.

20. In combination: a threaded drive shaft, a carriage having rotatable elements engaging the shaft thread, a window adapted for movement in a plane substantially parallel to the plane of the drive shaft, means interconnecting said carriage and said window for relative movement including a first member on said carriage, a second member on said window and means rockably connecting said members, means limiting the relative movement between the window and the carriage, and means cushioning the relative movement therebetween.

21. A device for converting rotary motion to longitudinal motion comprising driving and driven members, one of said members being rotatable and having an exterior thread of appreciable axial lead, and the other of said members including a load-bearing housing and a plurality of freely rotatable elements disposed in the housing to guidingly embrace the one member, said rotatable elements having opposed ends pivoted in the load-bearing housing for rotation about individual axes substantially parallel to the axis of rotation of said one member, said rotatable elements each having at least one thread-contacting unit, said unit having cross-sectional areas normal to its axis circular in form and diminishing progressively in either direction from the cross-section medial thereto, and said unit having cross-sectional areas parallel to its axis elliptical in form and diminishing progressively in area in either direction from the cross-sectional area taken through the axis of said unit, whereby to provide, inward from the crest of said thread, substantially a point contact between said rotatable elements and portions of said thread.

References Cited in the file of this patent

UNITED STATES PATENTS

| 511,679 | Buckley | Dec. 26, 1893 |
| 2,441,168 | Richardson | May 11, 1948 |
| 2,525,326 | Wahlmark | Oct. 10, 1950 |

FOREIGN PATENTS

| 711,201 | France | June 23, 1931 |
| 859,734 | France | Sept. 16, 1940 |